UNITED STATES PATENT OFFICE.

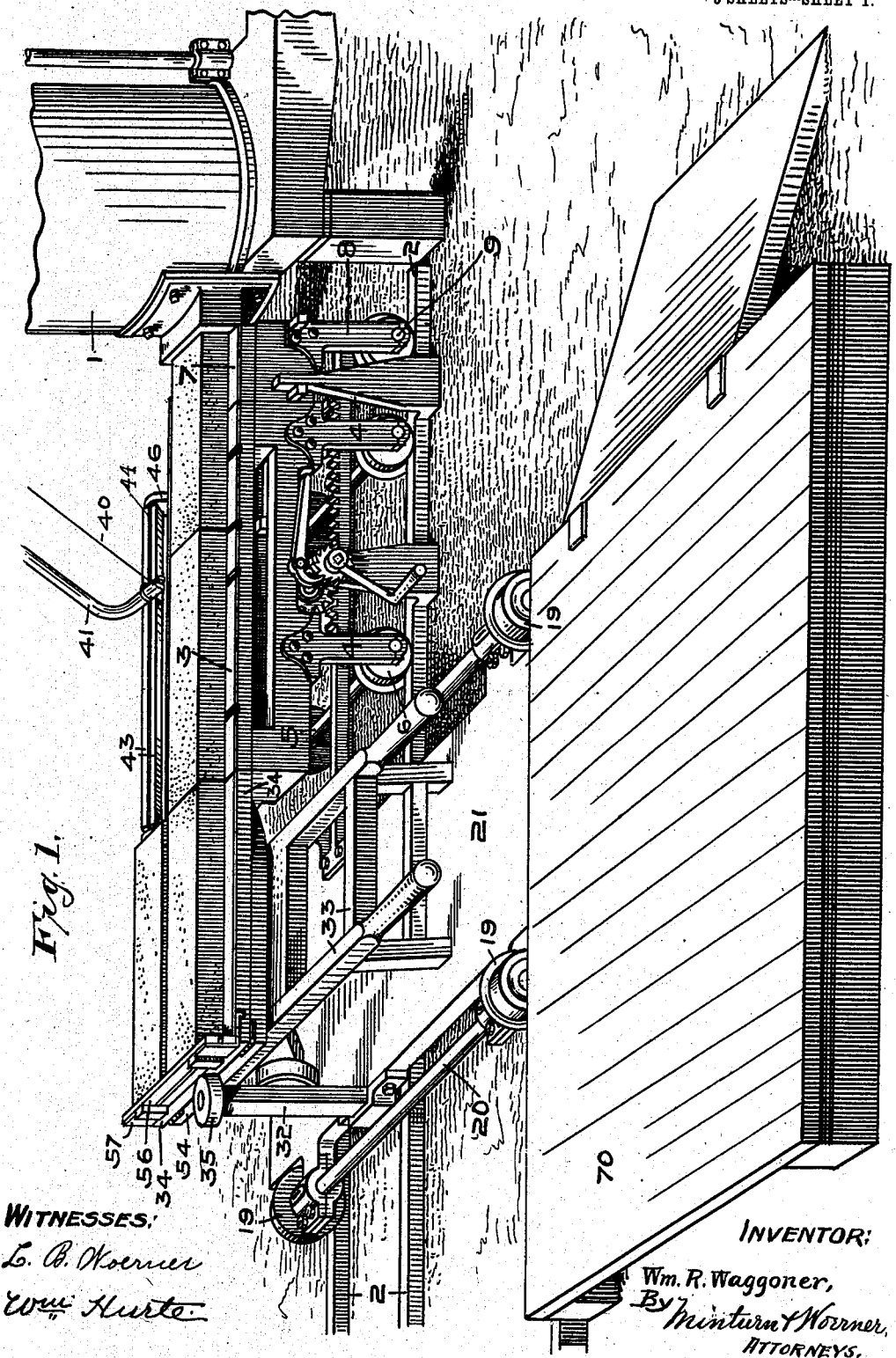

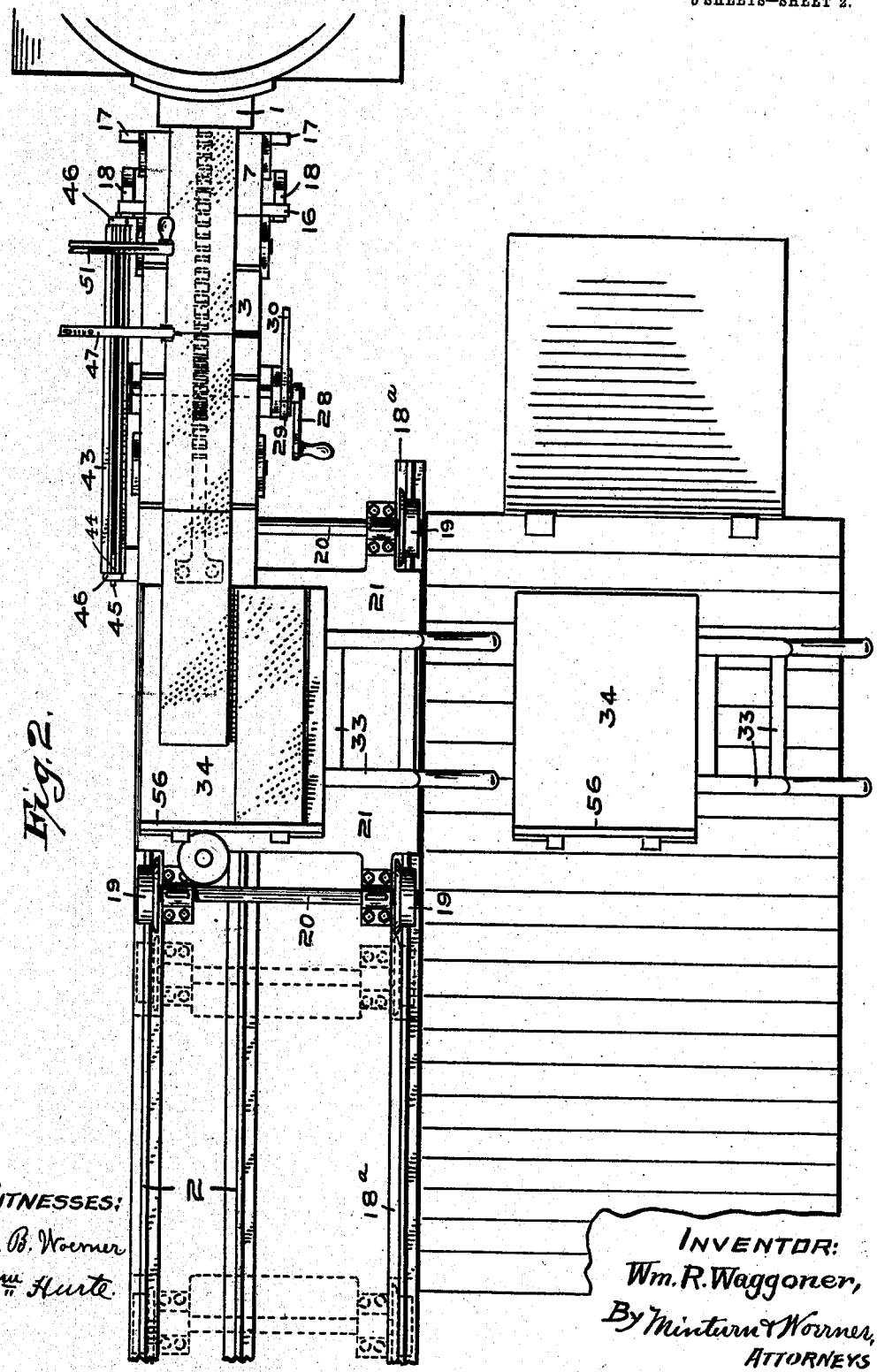

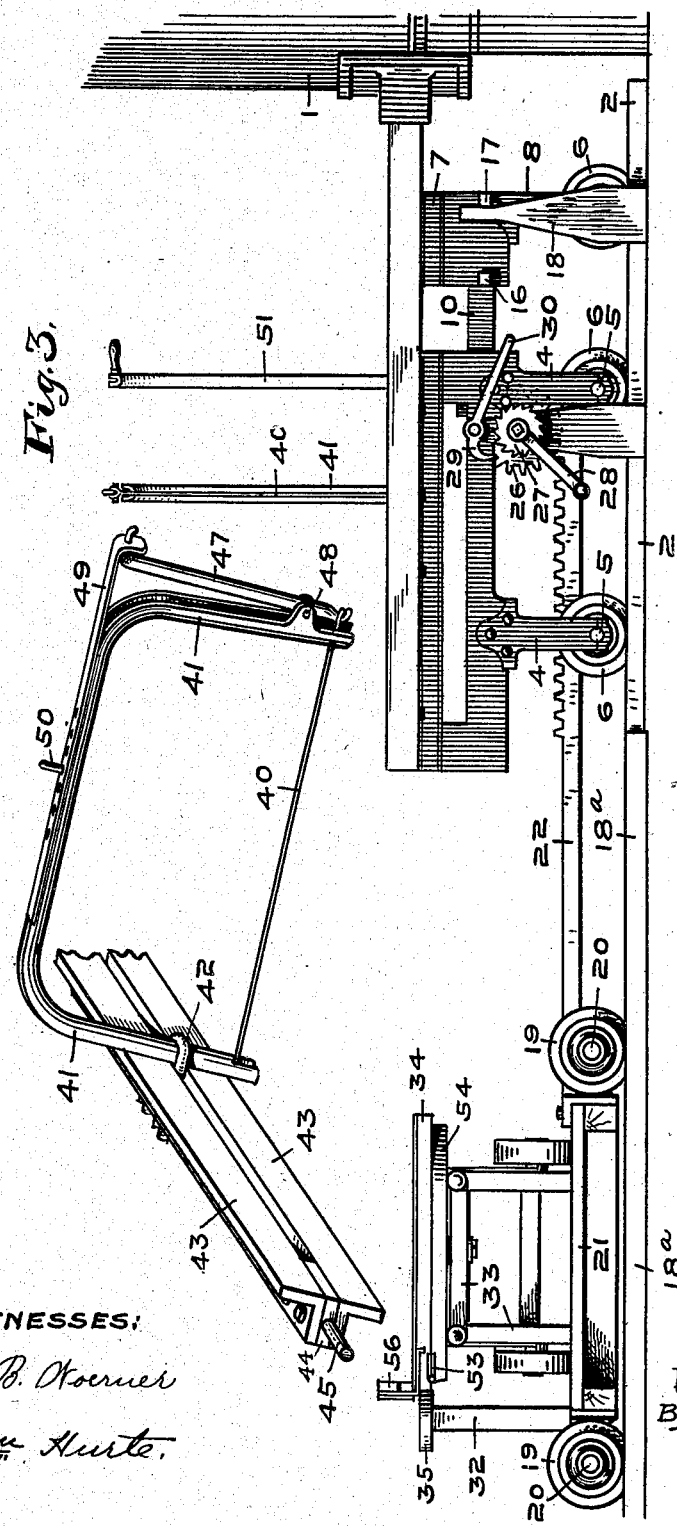

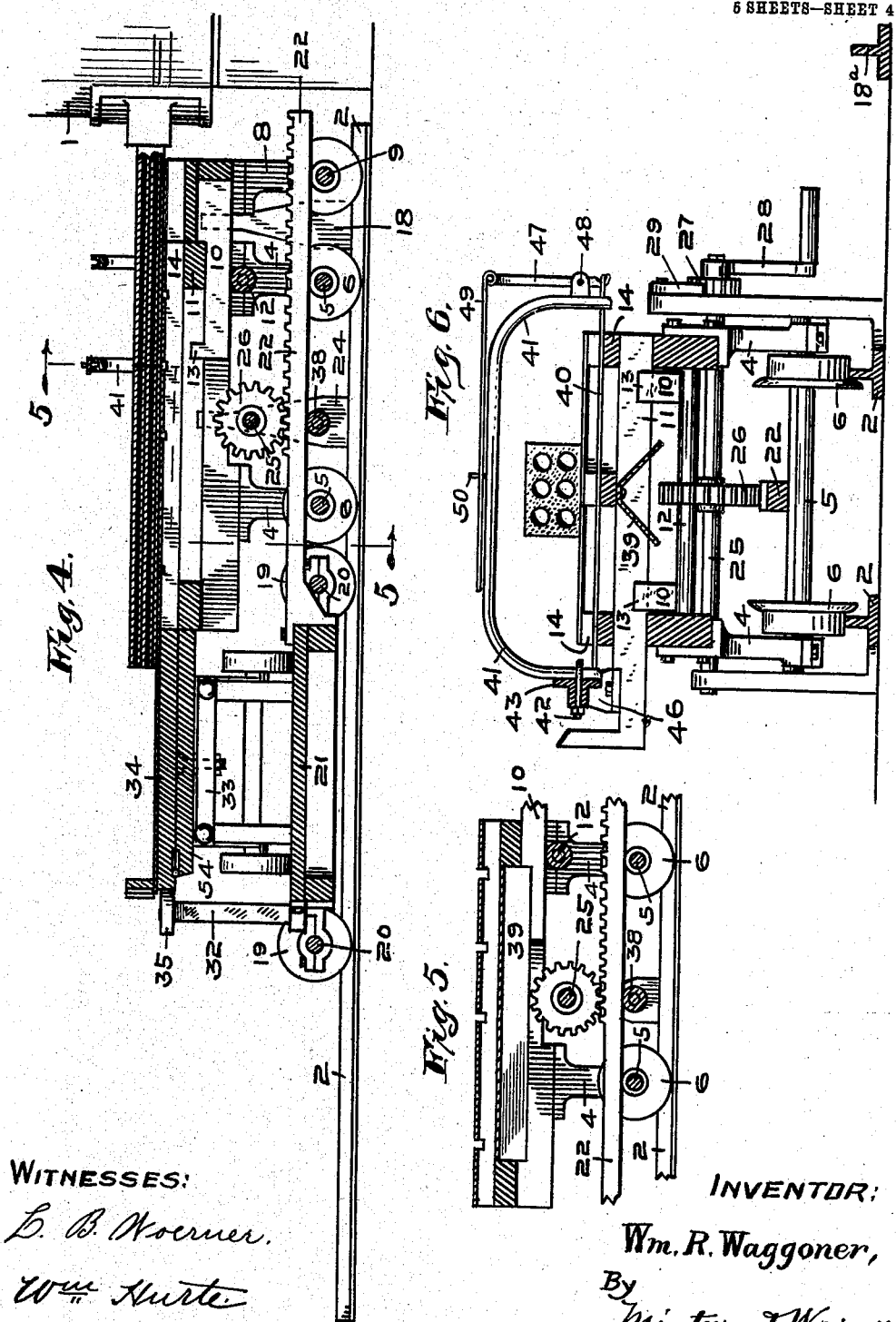

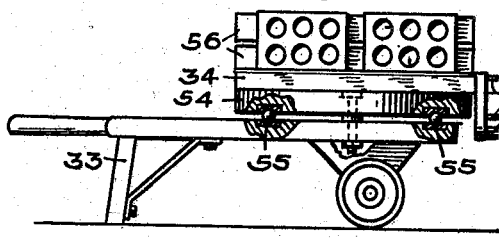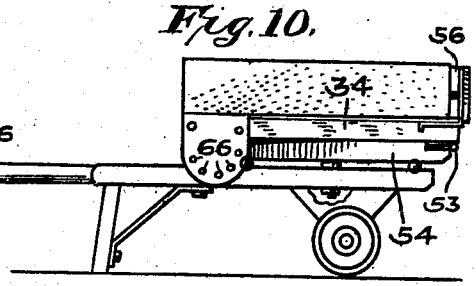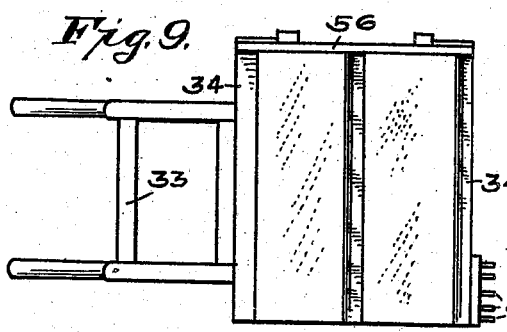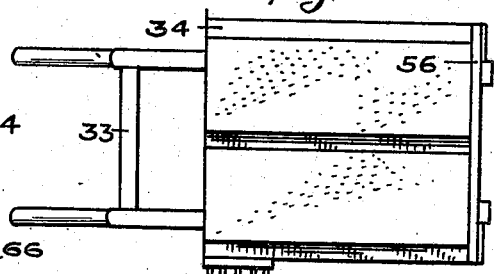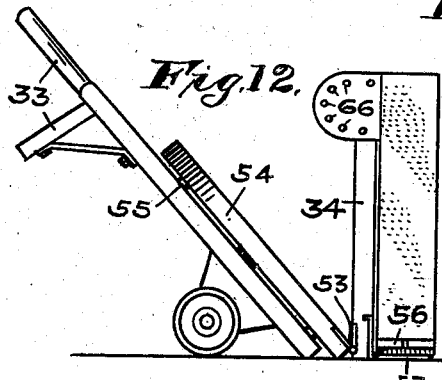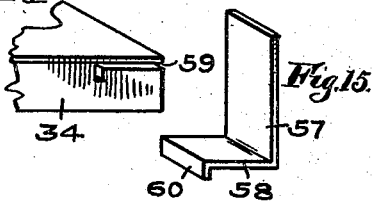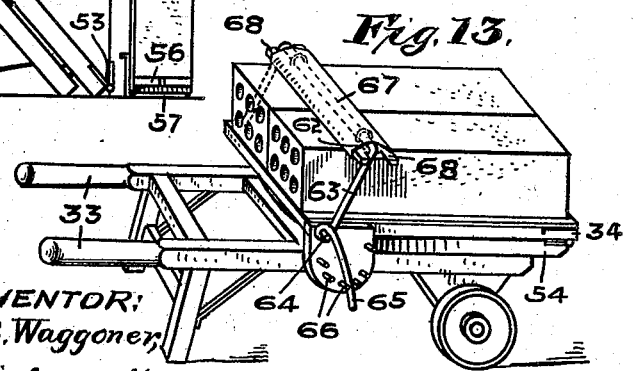

WILLIAM R. WAGGONER, OF BRAZIL, INDIANA, ASSIGNOR OF TWO-THIRDS TO GUY T. VAN CLEVE AND OSCAR O. VAN CLEVE, OF CORY, INDIANA.

OFF-BEARING MACHINE.

No. 885,809.  Specification of Letters Patent.  Patented April 28, 1908.

Application filed April 5, 1906, Serial No. 310,190. Renewed September 6, 1907. Serial No. 391,699.

*To all whom it may concern:*

Be it known that I, WILLIAM R. WAGGONER, a citizen of the United States, residing at Brazil, in the county of Clay and State of Indiana, have invented certain new and useful Improvements in Off-Bearing Machines, of which the following is a specification.

This machine relates to improvements in off-bearing machines for green conduits, tiles, and other clay products which issue from a suitable machine in an unbroken stream, to be afterwards cut into sections of the desired length, and the object of the invention is to provide means whereby this constant output can be cut into the required lengths and removed easily without stopping the mill.

The further object is to provide a simple, durable and easily operated mechanism such as will be hereinafter fully described and the novel features of which will be pointed out in the claims.

Referring to the accompanying drawings which illustrate my invention and form a part of this specification,—Figure 1 is a perspective view of my complete invention in its compact or closed position. Fig. 2 is a plan view of same in like position and showing the movable platform in dotted lines in its open or outer position. Fig. 3 is a side elevation of the device in expanded or open position as viewed from the stationary platform. Fig. 4 is a longitudinal vertical section through the tables and movable platform showing the said parts in their closed or closest relation to the mill and to each other. Fig. 5 is a detail in like section showing the shield for deflecting such material as may work through the table to otherwise clog the underlying rack and wheel. Fig. 6 is a transverse section on the line 5, 5, of Fig. 4. Fig. 7 is a perspective view of the cut-off and a part of the rocking shaft. Fig. 8 is a side elevation and Fig. 9 a plan view of the specially constructed truck with its adjustable table in position to receive the clay product. Fig. 10 is a side elevation and Fig. 11 a plan view of same with the table in position preparatory to dumping the load. Fig. 12 is a side elevation of the truck with a load dumped and the truck ready for withdrawal. Fig. 13 is a perspective view of the truck with the addition of an attachment for holding the clay articles by friction. Fig. 14 is a detail in perspective of a corner of the truck-table and Fig. 15 is a perspective view of one of the removable standards for holding the pallet.

Like characters of reference indicate like parts throughout the several views of the drawings.

1 represents the mill which is here shown as a plunger-mill but in general will be an auger-mill of any of the usual and suitable constructions.

2 are the rails of a track extending outward from the mill. These rails will preferably be T-iron or steel, inverted as clearly shown in Fig. 6. A table 3 supported on the legs 4 has the axles 5 which are mounted in suitable boxes at the lower ends of the legs. Flanged wheels 6 are mounted in a fixed manner on the axles and have their bearings on the rails 2.

Between the table 3 and the mill 1 is the table 7 having the legs 8 which terminate with boxes to receive the axle 9 on which are the fixed wheels 6 which also have their bearings on the said tracks. The table 7 is maintained with its top on a level with the top of table 3 by means of the slide-bars 10, which pass between the horizontal cross-bar 11 and transverse roller 12 of table 3, in the manner shown in Figs. 4, 5, and 6. The complete withdrawal of the slide-bars 10, and consequent separation of the two tables is prevented by the lugs 13 which contact with the cross-bar 11 and form stops to prevent separation. Both tables are surfaced with sheet metal which imparts a smooth surface to the product. These surface sheets are supported upon longitudinal bars 14 which in turn rest upon the cross-bars 11.

Projecting outwardly from the sides of the table 7 are the pairs of lugs 16 and 17, which are spaced a suitable distance apart to form stops to limit the movement of the table 3 on the tracks. This limitation is effected by the contact of the lugs with stationary posts or standards 18 which terminate between said lugs in the manner shown in Figs. 1, 2, and 3.

Running parallel with the rails 2 is the third rail $18^a$, and mounted on rail $18^a$ and the far one of the two rails 2, are the four flanged wheels 19. The wheels 19 are fixed on the axles 20, which axles are mounted in boxes that are supported and carried by the platform 21. The platform 21 is thus movably mounted on the above-described tracks. Attached to the platform and extending under the tables 3 and 7, parallel with the rails of the track is the rack-bar 22, and supported by the fixed standards 24, located on each side of the table 3, is the shaft 25 on which is mounted the fixed spur gear wheel 26, the teeth of which engage the cogs of the rack-bar 22. The shaft 25 also has the ratchet wheel 27 mounted in a fixed manner outside of standard 24, and the crank 28 mounted outside of the ratchet wheel. A pawl 29 having the handle extension on lever 30 is brought into contact with the teeth of the ratchet wheel by raising the handle, thereby preventing the rotation of shaft 25 in the direction which would move the platform 21 away from the tables. By rotating the shaft 25 in the opposite direction the platform 21 is drawn along the track toward the mill 1.

32 is a vertical post carried by the platform 21, and 33 is a wheeled truck carrying a table 34 which comes opposite a roller 35 mounted on the top of the post 32, when the truck is in proper operative position on the platform. Then, when the platform 21 is drawn toward the mill 1, the table of the truck is pressed by the roller 35, against the end of the table 3, and that table against the table 7, and the whole movable construction is forced along the tracks until all are arrested by the standards 18. The above parts are then in their closest relation to each other and to the mill and are retained in that relation until a finished conduit section has been pushed along the combined tables and deposited on the truck table. The truck table is made large enough to hold several conduit sections. In practice the inner one will be deposited on the truck first and then the truck will be moved in on the platform 21 to present an unfilled portion to receive a second piece of conduit. The number deposited upon each truck is of course not arbitrary: One, two, or more pieces may be placed thereon, depending upon the size of the pieces and the dimensions of the truck.

Supported by the standards 24 is a roller 38 which forms a support for the rack-bar 22. A shield 39 of sheet metal is attached to the middle longitudinal frame of table 3 to protect the wheel 26 and rack-bar 22, from particles of clay that work down through the tables.

The product coming from the mill will be an unbroken piece and will be divided transversely by means of a wire cut-off. This wire 40 is supported by a frame 41 like an inverted U in shape. One stem of this frame is clamped by a U-bolt 42 to a rock-bar 43. The latter is formed out of two angle bars which are bolted at their ends to the opposite sides of plates 44. The plates 44 have trunnions 45 by means of which the rock-bar is pivotally mounted on the brackets 46. The space between the two angle irons forms a slot to receive the stems of the U-bolts for the attachment of the frames 41 and because of the slot the bolts 42 can be slid in the slot to any desired position of the table so as to make the cut-off at any desired place.

Fig. 7 shows the above construction clearly and also shows the means for tightening the cutting wire. This means consists of a lever 47 pivoted near its lower end at 48 to the frame 41, to the lower end of which an end of the cutting wire is made fast. The other end of the cutting wire is made fast to the opposite stem of the U-frame in the usual way. The upper end of the lever 47 is hinged to a strap 49. The latter has a series of perforations through which, when the wire is drawn taut, the pin 50 on the top of the frame will be passed to hold the adjustment.

51 is simply a handle for raising and lowering the cut-off.

The table will be provided with a transverse groove for the cut-off wire to lay in below the top face of the table when lowered, which enables the product to pass over it till the length of a new section has passed, when, by raising the cut-off the separation will be made. It will thus be seen that each vertical movement of the cut-off is effective.

While the drawings show only a single cut-off frame and wire attached to the rocking-bar, a plurality of such frames may be used, if desired.

The table 34 of the truck 33 is hinged by means of the hinges 53 to the centrally pivoted platform or turntable 54, whereby the conduit sections which are deposited primarily with their longitudinal dimensions transverse to the truck may be turned to a position longitudinally of the truck, as illustrated in Figs. 8 to 11, inclusive. The turntable will preferably have the ball bearings 55 or other bearings to reduce the friction.

A pallet 56 for the clay product to stand on when it is discharged from the truck, is placed in vertical position on its side edge on the truck table and forms a stop for the clay conduit coming from the mill. The pallet is retained in position by the removable standards 57. In some cases the pallet will be dispensed with, which makes it desirable to dispense with the standards and for that reason the standards are made removable. This is secured by providing the standards with the right angled base 58 which is inserted between the metal top of the table 34 and the supporting portion below, in the slot 59 (see Fig. 14) and to prevent withdrawal longitudinally of the table 34, the base 59 is provided with the right angle flange 60 to enter a corresponding groove at the inner end of slot 59.

When the pallet is not used, the clay product is held from slipping off the truck by friction of a transverse board 62. The latter is hinged to the U-shaped bar 63 to allow it to adjust itself so as to lay flat against the clay article, and the arms of the bar 63 are pivoted at 64 to the edges of the table 34 (see Fig. 13). One of the arms has the extension 65 by which the bar 63 is swung on its pivots in a manner to cause the board 62 to advance or retreat from the clay product. A given adjustment is held by springing the arm 65 under a pin 66. A series of pins 66 provide for various adjustments of the arm. Direct and injurious contact of the board with the green clay product is prevented by a covering 67 of soft material such as cloth. Projections 68 from the ends of the board are provided to keep the board from turning over. When the friction device above described, is not required, as when the pallet is used, the bar 63 is detached from its pivots and thereby removed. The operation of the truck will be fully understood from the drawings.

A platform 70 may be used on one or both sides of my off-bearing device, depending on the surroundings. If there is room enough on both sides, it will be most convenient to wheel the empty truck from the near platform onto the movable platform, and then across upon a platform on the other side, and thence to the dry house or kiln. But if there is room for a platform on only one side of the machine, the loaded truck will have to back off to make room for an empty one.

The operation of my invention is as follows: When a truck on the movable platform is loaded, the movable platform is run out by turning the crank and the loaded truck is replaced by an empty one and the movable platform run back to the first position. The mill, of course, has been making new material continuously and this is taken care of, first, by the tables 3 and 7 moving out from the mill until the table 7 is arrested by the standards 18. Then the table 3 begins to separate from the table 7, and by the time both tables have traveled their maximum distance, the trucks have been exchanged and the movable platform is brought in by the use of the crank and the two tables 3 and 7 are closed up against the mill.

While I have described a machine for making conduit sections, it is applicable for making other products out of clay, and I do not desire to limit my invention to the manufacture of conduits.

Having thus fully described my invention, what I claim as new and wish to secure by Letters Patent, is—

1. In an off-bearing machine, a mill, a table movable longitudinally to and from the mill, a platform at the opposite end of the table from the mill movable in a direction longitudinally of the table, and a truck on the movable platform to receive and carry away the product coming to it over the table.

2. In an off-bearing machine, a mill, a table in a plurality of transversely divided sections each independently movable in a direction longitudinally of the table as a whole, a platform at the end of the table opposite the mill movable in the same direction as the table sections, and a truck on the platform to receive and carry off the product from the mill.

3. In an off-bearing machine, a mill, a platform movable toward and from the mill, means for moving the platform, and a table between the mill and the platform to receive the product from the mill, said table being movable by the action of the product from the mill when said table is not held by the platform.

4. The combination with a clay working mill of a track leading therefrom, a wheeled platform mounted on said track, a table between the platform and mill in a plurality of transversely divided parts, said table having wheels by which it is movably mounted on said track, a rack-bar fastened to the platform, a stationary shaft, means for rotating the shaft, a cog wheel mounted on the shaft having cogs to engage the teeth of the rack-bar, a truck adapted to be placed upon the platform to receive the product, means extending up from the platform to engage and press the truck against the table when the platform is moved toward the mill and thereby close the sections of the table together and toward the mill.

5. The combination of a mill, a track leading therefrom, a wheeled platform mounted on the track, a wheeled table mounted on a track between the said platform and mill, stationary standards, a shaft mounted on said standards having a crank at one end, a toothed wheel on said shaft, a rack-bar secured to the platform and extending into engagement with the toothed wheel, a truck mounted on the platform, said platform having a projection on the opposite side of the truck from the table, and a cut-off attached to the table for cutting the product of the mill into pieces.

6. In an off-bearing machine, a mill, a track leading therefrom, a table on wheels mounted on said track, said table being divided transversely into a plurality of sections, slide-bars connecting the several sections having stops to limit their separation, a platform on wheels mounted on the track at the opposite end of the table from the mill, said platform having a standard on its far side from the table and said platform having a rack-bar extending under the table, stationary standards at the sides of the table, a toothed wheel mounted on a shaft supported by said standards and engaging the rack-bars, and a wheeled truck on the platform between the truck standard and the end of the table.

7. In an off-bearing machine, a mill, a track leading therefrom, a platform on wheels mounted on said track, means for moving the platform on the track and for retaining it at a given position, a table in two transversely divided sections, slide-bars connecting the several sections having stops to limit their separation, the section of the table next to the mill having laterally projecting lugs in pairs to form stops, stationary standards projecting between said stops, and means on the platform for engaging the table and close the sections together and move the closed table toward the mill by the movement of the platform toward the mill.

8. In an off-bearing machine, a mill, a track leading therefrom, a platform on wheels mounted on said track, a table on wheels mounted on the track between the platform and the mill, a rack-bar fastened to the platform and extending under the table, a stationary shaft having a toothed wheel engaging the rack-bar, means for rotating the shaft, a ratchet wheel fixed on the shaft and a pawl engaging the ratchet wheel.

9. In an off-bearing machine, a track leading from the mill, a wheeled platform mounted on the track, means for moving it on the track, a table on wheels mounted on the track between the platform and the mill, a wheeled truck mounted on the platform, said truck having a table, sheet metal tops for all of the said tables, and means for pushing the wheeled platform toward the mill by moving the wheeled platform to bring its truck into contact with the wheeled table.

10. The combination of a mill, a table across which the mill discharges, and a truck to receive the product of the table, said truck having a turntable and a receiving table hinged to the turntable.

In witness whereof, I, have hereunto set my hand and seal at Indianapolis, Indiana, this, 26th day of September, A. D. one thousand nine hundred and six.

WILLIAM R. WAGGONER. [L. S.]

Witnesses:
    F. W. WOERNER,
    J. A. MINTURN.